US006905451B2

(12) United States Patent
Pajunen

(10) Patent No.: US 6,905,451 B2
(45) Date of Patent: Jun. 14, 2005

(54) ROPE HANDLE FORMING MACHINE AND METHOD

(76) Inventor: Kenneth J. Pajunen, 39 Campbell Crescent, R.R. #3, Collingwood, Ontario (CA), L9Y 3Z2

( * ) Notice: Subject to any disclaimer, the term of this patent is extended or adjusted under 35 U.S.C. 154(b) by 0 days.

(21) Appl. No.: 10/788,341

(22) Filed: Mar. 1, 2004

(65) Prior Publication Data

US 2004/0176231 A1 Sep. 9, 2004

(30) Foreign Application Priority Data

Mar. 4, 2003 (CA) ............................................. 2420805

(51) Int. Cl.$^7$ ............................................... B31B 1/86
(52) U.S. Cl. ........................ 493/226; 493/210; 493/212; 493/383; 493/926
(58) Field of Search ........................... 493/88, 210, 212, 493/223, 226, 383, 384, 909, 926; 53/413, 134.1; 156/443, 566, 567, 556

(56) References Cited

U.S. PATENT DOCUMENTS

| | | | |
|---|---|---|---|
| 1,762,857 A | * | 6/1930 | Eaton ........................... 227/21 |
| 2,224,040 A | | 12/1940 | Eaton et al. |
| 2,379,087 A | * | 6/1945 | Katz ............................ 227/21 |
| 2,844,075 A | | 7/1958 | Davis et al. |
| 3,101,033 A | | 8/1963 | Bonsor |
| 3,490,682 A | * | 1/1970 | Schwarzkopf ................ 383/15 |
| 3,706,625 A | * | 12/1972 | Jones et al. .................. 156/517 |
| 3,713,940 A | * | 1/1973 | Haugh et al. ................ 156/250 |
| 4,510,620 A | * | 4/1985 | Langen et al. ................ 383/14 |
| 5,350,350 A | | 9/1994 | Maccalli |
| 5,437,594 A | * | 8/1995 | Mattson et al. ............... 493/88 |
| 5,858,166 A | * | 1/1999 | James et al. ................. 156/443 |

* cited by examiner

Primary Examiner—Rinaldi I. Rada
Assistant Examiner—Hemant M. Desai
(74) Attorney, Agent, or Firm—Mario Theriault

(57) ABSTRACT

The rope handle forming machine is made of a cylinder having a channel therein, an U-shaped forming plate mounted along a horizontal plane tangent to the top surface of the cylinder on one side of the cylinder, and a D-shaped forming plate mounted in a same plane as the U-shaped forming plate on the other side of the cylinder, facing the U-shaped forming plate. A rope feeder is provided along the horizontal axis of the cylinder to feed a rope stock into the channel. A cutoff blade is used to sever a rope length from the rope stock. A push-up blade mounted in the channel moves upward when the cylinder rotates and the channel reaches a twelve o'clock position, to raise the rope length above the mentioned plane. The forming plates are movable toward each other along the plane to retain and form the rope length into an U-shaped form.

18 Claims, 2 Drawing Sheets

ROPE HANDLE FORMING MACHINE AND METHOD

FIELD OF THE INVENTION

This invention pertains to apparatus for making twisted paper or rope handles for shopping bags, and more particularly it pertains to apparatus for measuring, severing and forming an U-shaped rope handle, and for attaching the formed handle to a patch which is suitable for gluing to a bag web.

BACKGROUND OF THE INVENTION

A rope-handle shopping bag is made by attaching an U-shaped rope length to a patch made of heavier material than the bag web. The patch is then glued or hot melted to the bag web. The two sides of the bag web are then formed so that the positions of the handles are matched on each side of the bag. Rope handles are mostly made of twisted paper and are most often attached to bags made of paper, although plastic materials are also used for both the handles and the bag webs.

In the last decade or so, the plastic bag industry has been through difficult times because of the ecological concerns generated by the final disposal of plastic products in general. Many countries around the world are banning the use of plastics and reverting to paper for manufacturing packaging products. Environmental management systems such as ISO 14,000™ have been introduced to industries across the world in an effort to better control the growth of our landfill sites and the reduction of greenhouse and ozone layer depleting gases emanating from these sites. In numerous instances during the introduction of these new standards, paper has been cited as being a preferred material of manufacture for packaging products, because paper is recyclable and is harmlessly biodegradable, and therefore it is environmentally friendly.

Research conducted in the retail market has shown that shoppers have a preference for paper when it comes to handled shopping bags. Although paper grocery bag usage in North America is in the decline, no such decline has been seen in the use of paper in speciality shopping bags. It is believed that the market demand for paper shopping bags will be maintained or will improved in the future.

Rope handle forming machines currently available are extremely large and complicated. Some are integrated into large bag making machine, which are not practical for rapid change in sizes and to meet the needs of manufacturers who do small runs of various sizes at slower speeds. Also, because of the high cost and complexity of machinery currently available to manufacturers of shopping bags, much of this work has gone to third world countries where the work is done by hand.

Examples of prior art rope handle forming apparatus are described and illustrated in the following documents:
U.S. Pat. No. 2,224,040 issued to C. G. Eaton et al. on Dec. 3, 1940;
U.S. Pat. No. 2,844,075 issued to J. S. Davis et al. on Jul. 22, 1958;
U.S. Pat. No. 3,101,033 issued to D. V. Bonsor on Aug. 20, 1963;
U.S. Pat. No. 5,350,350 issued to G. Maccalli on Sep. 27, 1994;
U.S. Pat. No. 5,858,166 issued to D. R. James et al. on Jan. 12, 1999.

Although the devices and apparatus of the prior art deserve undeniable merits, it is believed that a market demand still exists for a rope handle making machine that can lower the cost of manufacture of handled shopping bags through lower investment in the machine; higher productivity through faster speeds and less maintenance due to the simplicity of the design. It is believed that a market demand still exists for a rope handle forming machine that can be incorporated into traditional rotary cutoff bag formation machines to easily convert them to shopping bag manufacturing machines.

SUMMARY OF THE INVENTION

The rope handle forming machine according to the present invention can be used to manufacture twisted U-shaped handles made of paper, rope or plastic strings and to attach these handles to paper or plastic patches either by gluing or hot melt welding processes. The rope handle forming machine can be operated in a stand alone mode to manufacture rope handles for later attachment to shopping bags manufactured elsewhere, or can be incorporated into a bag manufacturing process. Preferably the rope handle forming machine is incorporated as a module in an existing production line between the roll stand that hold the bag material and the bag forming machine. If a printing press is utilized, the rope handle forming machine according to the present invention can be placed between the printing press and the bag forming machine.

Another advantage of the rope handle forming machine according to the present invention is that the rope handles formed thereon require less materials for the patch than traditional machines since the handles do not require patches on both sides of the rope lengths.

When the rope handle forming machine is incorporated into a bag manufacturing process, a pair of these machines are preferably utilized to cut, form and attach a pair of rope handles onto a pair of patches that are then glued or hot melted onto both sides of a bag web simultaneously. The bag is then formed and sent to a stacking or packaging station.

In a broad aspect of the present invention, there is provided a process for forming a rope handle comprising the steps of providing a cylinder having a channel there along; providing a U-shaped forming plate movable along a plane tangent to a surface of the cylinder; providing a D-shaped forming plate movable along the plane mentioned above and into the U-shaped forming plate. The method also comprises the steps of feeding a rope stock into the channel; cutting the rope stock into a rope length; raising the rope length outside the channel and exposing the rope length above a surface of the cylinder along the mentioned plane, between the U-shaped forming plate and the D-shaped forming plate. Then the D-shaped forming plate and the U-shaped forming plate are moved into mutual engagement, thereby pulling a central segment of the rope length therein and forming an U-shaped handle with the rope length. The U-shaped handle is then moved over a patch handle and attached to the patch handle.

In another aspect of the present invention, the process of forming a rope handle comprises the additional step of forming creases in the patch material and encasing the straight segments of the U-shaped handle into these creases.

In yet another aspect of the present invention, there is provided a rope handle forming machine, comprising a cylinder having a channel therein and a horizontal axis of rotation; an U-shaped forming plate mounted along a plane tangent to the surface of the cylinder on one side of the cylinder. The U-shaped forming plate has a U-shaped opening therein and an open end facing the cylinder. The rope forming machine also has a D-shaped forming plate mounted in a same plane as the U-shaped forming plate at a distance from said U-shaped forming plate on the other side of the cylinder, facing the open side of the U-shaped forming plate. A rope feeder is provided along the horizontal axis of the cylinder to feed a rope stock into the channel. A push-up blade is mounted inside the channel and moves upward when the cylinder rotates and the channel reaches a twelve o'clock position relative to the horizontal axis. The push-up blade moves upward to raise the rope length above the cylinder's surface and into the plane of the forming plates.

The forming plates are movable toward each other to retain and form the rope length into an U-shaped form. A pair of pinch rolls are provided to move the rope length in an U-shaped form from the forming plates to a vacuum roll. The vacuum roll a has a vacuum pad thereon for retaining a handle patch. A press roll rotates against the vacuum roll to assist a gluing or a hot melt welding process in attaching the rope length in an U-shaped form to the handle patch.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

One embodiment of the present invention is illustrated in the accompanying drawings, in which like numerals denote like parts throughout the several views, and in which.

DESCRIPTION OF THE PREFERRED EMBODIMENT

Figure 1:
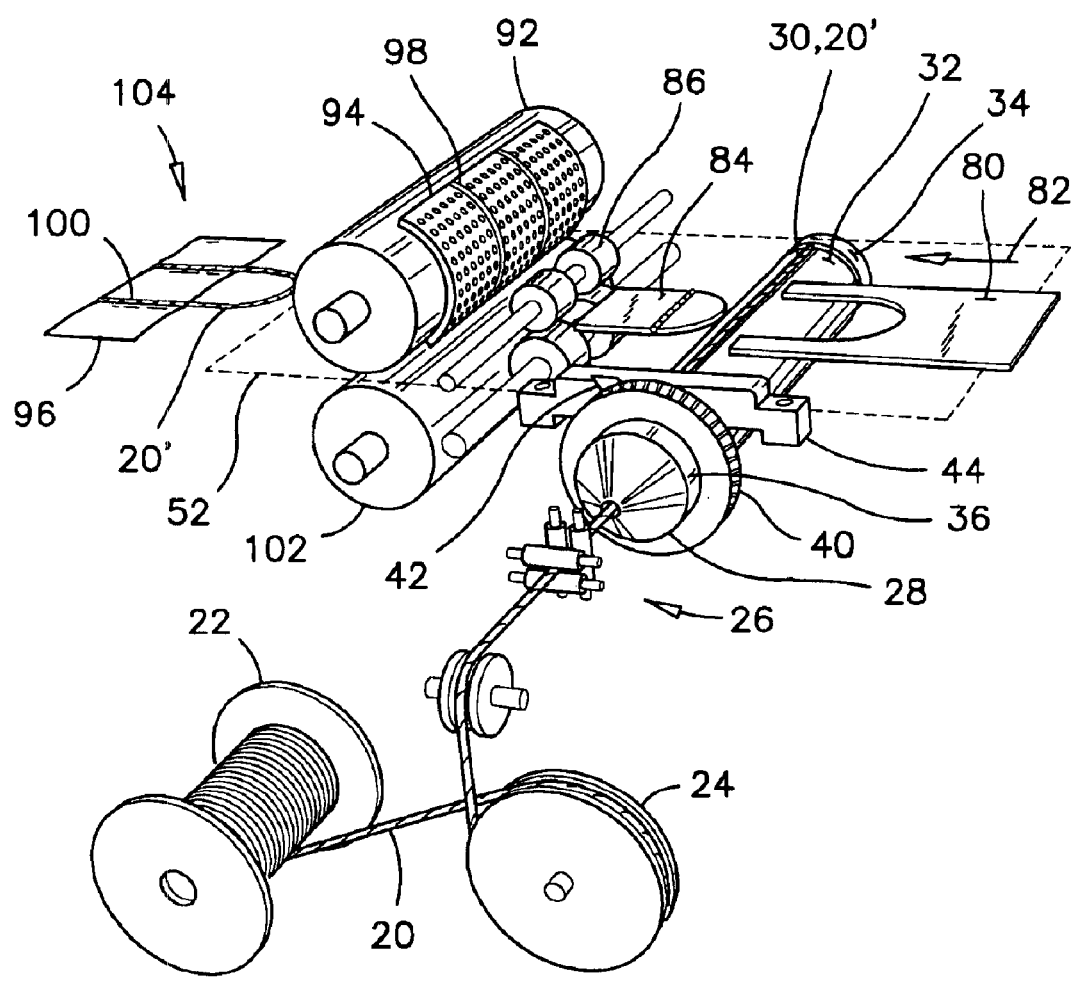
FIG. 1 is a perspective side and top view of the rope handle forming machine according to the preferred embodiment.

While this invention is susceptible of embodiment in many different forms, there is shown in the drawings and will be described in details herein one specific embodiment, with the understanding that the present disclosure is to be considered as an example of the principles of the invention and is not intended to limit the invention to the embodiment illustrated and described.

The rope handle forming machine according to the preferred embodiment is illustrated herein in a schematic manner for clarity. Many components of this rope handle forming machine are not illustrated to facilitate the understanding of the basic principles of this apparatus. The components that were not illustrated are those for which the natures, mountings and functions would be obvious to the persons skilled in the art of Machine Design in general.

The rope handle forming machine according to the preferred embodiment is also described in term of its operation and the function of its components. The physical dimensions, material type and manufacturing tolerances of the individual parts are not provided herein because these details also do not constitute the essence of the present invention and are considered obvious to the skilled artisan.

Referring firstly to FIG. 1, the rope stock 20 is fed from a spool 22 of rope material through a rope feed pulley 24 located in the lower part of the rope handle forming machine. The rope stock 20 is wound around the feed pulley 24 to provide maximum pull from the rope spool 22 and prevent slippage. This feed pulley 24 is synchronized in rotation to match the machine's speed. The rope stock 20 is fed through the rope feeder assembly 26, which pushes the rope stock into the main cylinder's inlet cone 28 and into the rope channel 30 along the main cylinder 32.

Figure 4:
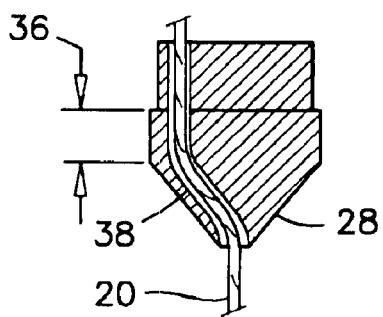
FIG. 4 is an enlarged horizontal cross-section view of the cylinder inlet cone as seen in the detail circle 4 in FIG. 2.

The main cylinder 32 is supported on both ends thereof in a pair of block bearings (not shown). The block bearings engage with the cylindrical surfaces shown by labels 34 and 36. The bearing surface 36 in particular is further defined in FIG. 4. This drawing also illustrates a cross-section of the inlet cone 28 and of the rope guide 38 there through wherein the rope material 20 is fed from the centre of the inlet cone 28 along the axis of the main cylinder 32 to the rope channel 30 at the circumference of the main cylinder 32.

Figure 2:
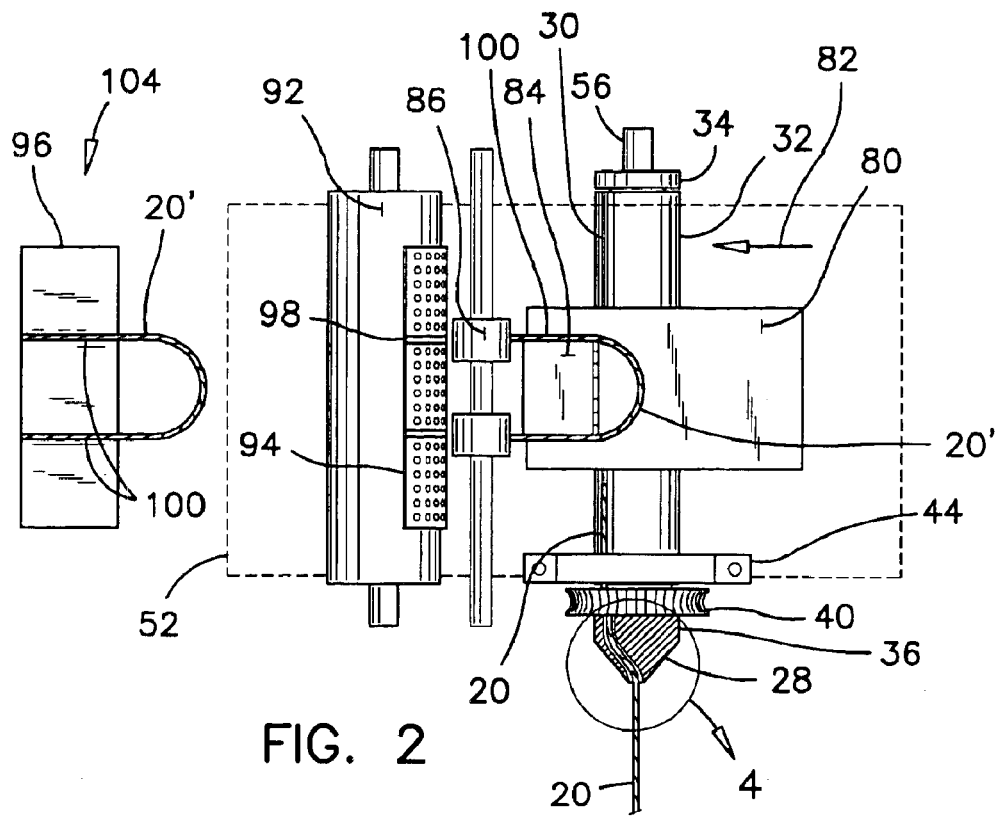
FIG. 2 is a partial top view of the rope handle forming machine according to the preferred embodiment.

The main cylinder 32 is driven by a ring gear 40 as shown in FIGS. 1 and 2 which is also synchronized in rotation to run in sequence with the other components of the rope handle forming machine as will be understood though the following description. With each rotation of the ring gear 40, a rope length 20' is cut by means of a rope cutoff knife blade 42, mounted to a knife holder 44, as illustrated in FIG. 5.

Immediately after the rope stock 20 has been severed to the proper length by the knife blade 42, the rope feeder assembly 26 pulls back ¾" or so to leave space for the cutoff knife blade 42 to travel past the rope channel 30. When the rope length 20' is being formed, the rope feeder assembly 26 moves back to feed another length of rope stock 20 into the rope channel 30. The back and forth movements of the rope feeder assembly 26 along the axis of the main cylinder 32 is better effected by an air cylinder (not shown) located under the machine, although other arrangements can also be used.

As the main cylinder 32 rotates and brings the rope channel 30 at the twelve o'clock position 46, a rope push-up blade 50 located inside the main cylinder 32 pushes the cut rope length 20' from the rope channel 30 to a position clear above the surface of the main cylinder 32 and above the machine's table which is illustrated by the horizontal plane 52 in FIGS. 1–3 and 5. The plane 52 which represents the top surface of the machine's table extends tangent to the top surface of the main cylinder 32.

Figure 5:
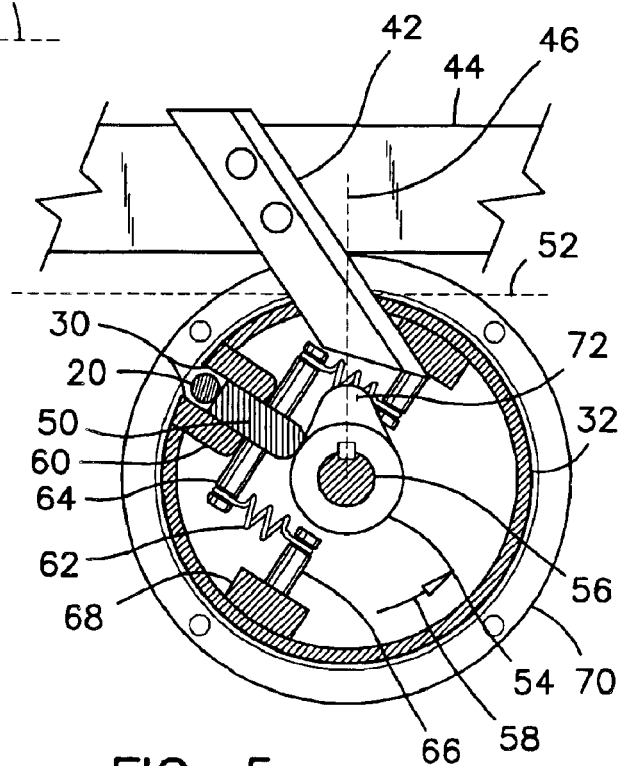
FIG. 5 is a vertical cross-section view of the main cylinder, as seen along the knife holder of the rope handle forming machine according to the preferred embodiment.

For reference purposes, the rope channel 30 is shown at a ten o'clock position in FIG. 5. The push-up blade 50 is also illustrated in FIG. 5. The push-up blade 50 is activated radially by two lifter cams 54. These cams 54 are mounted on a stationary shaft 56 along the axis of the main cylinder 32. The main cylinder 32 rotates around this stationary shaft 56 in the direction of the arrow 58. Both cams 54 are spaced apart along the stationary shaft 56 a distance of about half the length of the main cylinder 32.

The push-up blade 50 is held between the sides 60 of the rope channel 30. The push-up blade 50 extends substantially the full length of the rope channel 30. The push-up blade 50 is urged toward the stationary shaft 56 by means of spring pairs 62 attached to the transverse pins 64 which are affixed to the push-up blade 50 and to the transverse pins 66 affixed to anchor blocks 68 protruding from the inside surface of the main cylinder 32. At least two spring pairs 62 are preferably used to retain the push-up blade 50 to the bottom of the rope channel 30 during a major sector of rotation of the main cylinder 32. The locations of the spring pairs 62 alternate with or are otherwise adjacently positioned from the cams 54 along the main cylinder 32. The sides 60 of the rope channel 30 have transverse slots therein (not shown) to allow a radial movement of the transverse pins 64 relative to the main cylinder.

The position of the knife blade 42 relative to the axis of the main cylinder 32 is slightly ahead of the twelve o'clock angle 46, as illustrated in FIG. 5 such that the rope stock 20 gets severed entirely by the knife blade 42 before the rope channel 30 reaches this uppermost position. During the cutting of the rope stock 20, the portions of the rope stock on both sides of the knife blade 42 are preferably retained inside the channel 30. Such retention of the rope stock 20 is effected by the rope guide 38 on one side of the knife blade 42 and a ring 70 mounted over the end of the main cylinder 32, under the knife holder 44.

The cams 54 have lobes 72 at the twelve o'clock angle of the stationary shaft 56. Consequently, as the main cylinder 32 rotates, the push-up blade 30 reaches the lobes 72, and is urged upward by the lobes 72, thereby pushing the rope length 20' out of the rope channel 30 to the a region immediately above the plane 52.

As the push-up blade 50 reaches its uppermost position, it exposes the rope length 20' above the main cylinder 32. An outer U-shaped forming plate 80 mounted along the plane 52, as illustrated in FIG. 1 moves in a downstream direction 82 toward the raised rope length 20' and pushes the rope length 20' against an inner D-shaped forming plate 84 as illustrated in FIG. 2. During the motion of the outer U-shaped forming plate 80, the inner D-shaped forming plate 84 may also be moved toward the outer forming plate 80 to swiftly move the rope length 20', and especially to more easily align the ends of the rope length 20' in the downstream direction 82. These movements of the outer and inner forming plates 80, 84 cause the central segment of the rope length 20' to be caught between the forming plates 80, 84, giving it an U-shaped form and leaving the rope ends extending freely beyond both plates.

Figure 3:
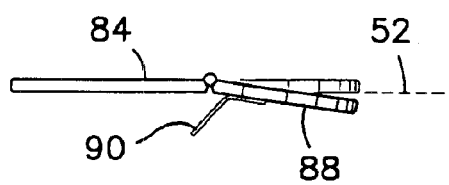
FIG. 3 is a side view of the inner forming plate.

Then, the outer forming plate 80 and the inner forming plate 84 move in unison in the downstream direction 82 to carry the U-shaped rope length 20' to the handle transfer rolls, or pinch rolls 86. As the pinch rolls 86 grab the free ends of the rope length 20', the tip 88 of the inner forming plate 84 is tilted momentarily downward, as shown in FIG. 3, by an actuator 90 moving against a cam or otherwise (not shown) to release the central segment of the rope length 20', thereby allowing the rope length 20' to move freely toward the vacuum cylinder 92.

A roll of patch material (not shown) may be mounted downstream of the rope handle forming machine according to the preferred embodiment. The patch material is fed through the top of the rope handle forming machine over rollers, feed rolls, and through a rotary cutoff knife which is timed to cut each patch to the desired width (not shown). As the patch is cut off, it is transferred by a known process to the vacuum roll 92 where it is held by vacuum over a grooved pad 94.

Glue is applied to the patch 96 along two strips which coincide with two grooves 98 in the vacuum pad 94 and with the alignments of the straight segments 100 of the rope length 20'.

The rotation of the pinch rolls 86 and of the vacuum roll 92 are synchronized to overlap the straight segments 100 of the rope length 20' over the handle patch 96, in alignment with the grooves 98 of the grooved pad 94. A press roll 102 is mounted below the vacuum roll 92 and rolls against the vacuum roll 92 to force the straight segments 100 of the U-shaped rope length 20' into the grooves 98, thereby deforming the patch material into the grooves 94 and forming creases in the patch material, in which the straight segments 100 are encased. The pressing of the straight segments 100 in the creases causes the strips of glue to spread around the straight segments 100 and to the patch 96.

It will be appreciated that this encasing and gluing actions of the rope length 20' to the patch 96 provides a strong bond. The finished bag handle 102 can then be bonded to a bag web by a known glue or hot melt welding process. In this handle, portions of the straight segments 100 of the rope length 20' are exposed on their side opposite the creases for gluing to the bag web. These portions are later glued or hot melted to the bag web, thereby providing a stronger bond of the rope handle 104 to the shopping bag.

As to other manner of usage and operation of the present invention, the same should be apparent from the above description and accompanying drawings, and accordingly further discussion relative to the manner of usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A rope handle forming machine, comprising:
   a cylinder having a channel there along and a horizontal axis of rotation;
   a horizontal plane tangent to a top surface of said cylinder;
   an U-shaped forming plate mounted along said plane on one side of said cylinder, said U-shaped forming plate having an U-shaped opening therein and an open end oriented toward said cylinder;
   a D-shaped forming plate mounted along said plane at a distance from said U-shaped forming plate on the other side of said cylinder opposite said one side;
   means to feed a rope length into said channel;
   means to raise said rope length from said channel to a position above said plane;
   means comprising said U-shaped forming plate and said D-shaped forming plate to form said rope length into an U-shaped form, and
   means to affix said rope length in said U-shaped form to a handle patch.

2. The rope handle forming machine as claimed in claim 1, further comprising an inlet cone mounted at one end of said cylinder, said inlet cone having a rope guide therein having a first extremity along said horizontal axis and a second extremity near a circumference of said cylinder, in alignment with said channel.

3. The rope handle forming machine as claimed in claim 2, wherein said inlet cone has a bearing surface thereon for supporting an end of said cylinder.

4. The rope handle forming machine as claimed in claim 3, further comprising a ring gear mounted to said inlet cone for rotating said cylinder.

5. The rope handle forming machine as claimed in claim 4, further comprising a knife blade extending substantially radially relative to said cylinder, across a projection of said channel between said inlet cone and said cylinder for severing said rope length from a rope stock, said knife blade being positioned to sever said rope length during a rotation of said cylinder before said channel reaches a twelve o'clock position relative to said horizontal axis.

6. The rope handle forming machine as claimed in claim 5, further comprising a ring enclosing said cylinder near said knife blade for holding said rope stock during a severing of said rope stock by said knife blade.

7. The rope handle forming machine as claimed in claim 1, wherein said means to raise said rope length from said channel to a position above said plane comprises a push-up blade mounted in said channel and means to raise said push-up blade when said channel is at a twelve o'clock position relative to said horizontal axis.

8. The rope handle forming machine as claimed in claim 7, wherein said means to raise said push-up blade comprises a cam mounted on a stationary shaft along said horizontal axis.

9. The rope handle forming machine as claimed in claim 8, further comprising springs mounted between an inside surface of said cylinder and said push-up blade for urging said push-up blade against said cam.

10. The rope handle forming machine as claimed in claim 1, further comprising means to move said D-shaped forming plate along said plane and into said U-shaped opening.

11. The rope handle forming machine as claimed in claim 10, further comprising means to move said D-shaped forming plate in unison with said U-shaped forming plate.

12. The rope handle forming machine as claimed in claim 11, wherein said D-shaped forming plate has a tip and means to momentarily tilt said tip below said plane.

13. The rope handle forming machine as claimed in claim 1, wherein said means to affix said rope length in said U-shaped form to a handle patch comprises a vacuum roll and means to move said rope length in said U-shaped form from said D-shaped forming plate and said U-shaped forming plate to said vacuum roll.

14. The rope handle forming machine as claimed in claim 13, wherein said means to move said rope length comprises pinch rolls, mounted between said D-shaped forming plate and said vacuum roll.

15. The rope handle forming machine as claimed in claim 14, wherein said vacuum roll comprises a grooved pad, and said means to move said rope length comprises means to align portions of said rope length with grooves on said grooved pad.

16. The rope handle forming machine as claimed in claim 15, further comprising means to form creases in said handle patch along said grooves, and means to encase said portions of said rope length in said creases.

17. The rope handle forming machine as claimed in claim 16, wherein said means to encase said portions of said rope length in said creases comprises a pressure roll rolling against said vacuum roll.

18. A rope handle forming machine, comprising:

a cylinder having a channel there along and a horizontal axis of rotation;

a horizontal plane tangent to a top surface of said cylinder;

an U-shaped forming plate mounted along said plane on one side of said cylinder, said U-shaped forming plate having an U-shaped opening therein and an open end oriented toward said cylinder;

a D-shaped forming plate mounted along said plane at a distance from said U-shaped forming plate on the other side of said cylinder opposite said one side;

means to feed a rope length into said channel comprising an inlet cone mounted at an end of said cylinder, said inlet cone having a rope guide therein having a first extremity along an axis of rotation of said cylinder and a second extremity near a circumference of said cylinder, in alignment with said channel;

means to raise said rope length from said channel to a position above said plane when said channel is at a twelve o'clock position relative to said horizontal axis, comprising a push-up blade mounted in said channel and a cam mounted on a stationary shaft along said horizontal axis, and springs mounted between an inside surface of said cylinder and said push-up blade for urging said push-up blade against said cam; said cam having a lobe pointing at said twelve o'clock position;

means comprising said U-shaped forming plate and said D-shaped forming plate moving toward each other, to form said rope length into an U-shaped form, and means to affix said rope length in said U-shaped form to a handle patch comprising means to form creases in said handle patch and means to encase portions of said rope length in said creases.

\* \* \* \* \*